United States Patent [19]
Perna et al.

[11] 3,828,136
[45] Aug. 6, 1974

[54] TIME DIVISION TELEPHONE SWITCHING EXCHANGE

[75] Inventors: Aldo Perna, Varese; Giuseppe Valbonesi, Villaggio Luicana Vighignolo, both of Italy

[73] Assignee: Societa Italiana Telecomunicazioni Siemens s.p.a., Milan, Italy

[22] Filed: June 15, 1972

[21] Appl. No.: 263,124

[30] Foreign Application Priority Data

June 18, 1971 Italy .................................. 26040/71

[52] U.S. Cl. .......................... 179/15 BF, 179/15 AT
[51] Int. Cl. ............................................... H04j 3/14
[58] Field of Search ........... 179/18 ES, 15 BF, 18 J, 179/15 AT; 307/219; 340/172.5

[56] References Cited

UNITED STATES PATENTS

| | | | |
|---|---|---|---|
| 3,161,732 | 12/1964 | Martin | 179/15 BF |
| 3,557,315 | 1/1971 | Kobus | 179/18 ES |
| 3,643,032 | 2/1972 | Ulrich | 179/18 ES |
| 3,657,483 | 4/1972 | Bosonnet | 179/15 AT |

*Primary Examiner*—Kathleen H. Claffy
*Assistant Examiner*—David L. Stewart
*Attorney, Agent, or Firm*—Karl F. Ross; Herbert Dubno

[57] ABSTRACT

A TDM telephone exchange serving a multiplicity of subscriber lines has a primary and a secondary processor each including a caller memory, a responder memory and a monitoring memory, stepped in synchronism through a multiplicity of phases including service phases for the establishment of a connection and conversation phases for enabling communication between two subscribers. The associated subscriber lines are periodically scanned in successive memory cycles; the address of any such subscriber found to be in the process of initiating the call, if not yet entered in a phase of the caller or the responder memory of either processor as determined during a service phase, is entered in the first available conversation phase of either caller memory whereupon the address of the called subscriber is registered in the corresponding phase of the associated responder memory to let the conversation proceed under the control of appropriate entries in the monitoring memory of the same processor. If the first vacant phases of the two caller memories coincide, preference is given to the memory of the first processor. If a fault develops in either processor, the other one is used on all calls. With subscriber lines arranged in groups along common branches of two main signal paths, entry in a vacant phase of either caller memory is possible only if the concurrent phases of the caller and responder memories of the other processor do not carry the address of another subscriber of the same group; otherwise, the address of the new caller is transferred to the next available phase not subject to this restriction.

2 Claims, 4 Drawing Figures

TIME DIVISION TELEPHONE SWITCHING EXCHANGE

FIELD OF THE INVENTION

Our present invention relates to a telephone exchange of the time-division-multiplex (TDM) type provided with two computers for controlling the connection-establishing operations.

BACKGROUND OF THE INVENTION

One of the problems which beset modern electronic exchanges is that of their reliability. In general, these exchanges are equipped with a centralized computer which controls a switching network comprising the devices which establish the physical connection among the various subscriber telephone sets. Its structure is such as to allow an easy trouble propagation which causes the failure of the whole exchange when a malfunction recurs in its most vital parts. The solutions presently adopted for this problem involve relatively complex control systems (see commonly owned U.S. Pat. Nos. 3,610,842 and 3,641,275) and the subdivision of the subscriber circuits for an exchange into selectable groups (see commonly owned U.S. Pat. No. 3,624,304).

Although the hitherto proposed controls enable timely detection of a failure in the computer, they do not prevent a temporary deactivation of the computer. It has already been proposed to employ two distinct centralized computers, one working and the other as a standby, in one and the same switching network.

This solution, though, has the inconvenience of not completely utilizing the operating capacity of the system during normal operation.

OBJECT OF THE INVENTION

The object of our present invention is to provide a TDM telephone exchange in which the switching network and the centralized processing unit are wholly utilized in normal operation and, in the event of a failure, enable continued functioning with a reduced switching capacity.

SUMMARY OF THE INVENTION

In accordance with our present invention we provide, in an exchange of a TDM communication system, a primary processor and a secondary processor each including a circulating caller memory, a circulating responder memory and a circulating monitoring memory each divided into a predetermined number of service phases and conversation phases representing respective time slots in a recurrent memory cycle, as described in commonly owned U.S. Pat. No. 3,581,016. Thus, the conversation phases of the caller and subscriber memories serve for the storage of addresses of subscriber lines initiating a call or engaged in a conversation; the conversation phases of each monitoring memory serves for the storage of data relating to a call initiated or in progress from a subscriber whose address is entered in a corresponding conversation phase of the associated caller memory. All memories of both processors are synchronously stepped by a timer through consecutive memory cycles. A scanner in each processor periodically samples, in a service phase of successive memory cylces, the subscriber lines associated with the exchange for ascertaining their activity, if any; upon the detection of an active subscriber line, a test circuit determines whether or not the address of that line has been entered in any conversation phase of the two caller and the two responder memories, i.e., whether such a phase has already been allocated to that line. If not, a first allocator in each processor searches, under the control of its monitoring memory, for the first free conversation phase of the associated caller memory; if the first free conversation phases of the two caller memories coincide, a preference circuit controlled by both monitoring memories inhibits the entry of that address in the caller memory of the secondary processor. A malfunction detector, responsive to a fault indication from either processor, limits the operation of this first allocator to the other, faultless processor and, if the fault lies in the primary processor, renders the preference circuit ineffectual. Thereafter, as the calling subscriber identifies a called subscriber in the usual manner, the monitoring memory registers that information in the corresponding conversation phase whereupon a second allocator enters the address of the latter subscriber in the proper phase of the associated responder memory preparatorily to the establishment of a connection between the two lines.

The connection between the subscriber lines and the two processors may include two parallel signal paths having branches common to several groups of subscribers. In this event, pursuant to another feature of our invention, a checking circuit determines upon the detection of a first free conversation phase in the caller memory of one processor whether or not a concurrent phase in the caller memory or the responder memory of the other processor contains the address of a subscriber line in the same group as the one about to be entered. If the address of such a commonly grouped subscriber line is found entered in a concurrent phase, then entry of the address of the newly active subscriber line in that free phase of the first-mentioned processor is prevented. If, upon the entry of the address of a called subscriber line in the corresponding phase of the first processor, the check circuit ascertains the presence in a concurrent phase of the caller or responder memory of the other processor of the address of a line commonly grouped with the called line, a transfer circuit controlled by the checking circuit shifts the addresses of the newly active calling line and the selected called line from the first-allocated conversation phase in the caller and responder memories of the first-mentioned processor to the next free conversation phase in the same memories which does not coincide with a conversation phase in either the caller memory or the responder memory of the other processor containing the address of a commonly grouped subscriber line.

BRIEF DESCRIPTION OF THE DRAWING

Our invention will now be described in greater detail with reference to the accompanying drawing in which.

SPECIFIC DESCRIPTION

Figure 1:
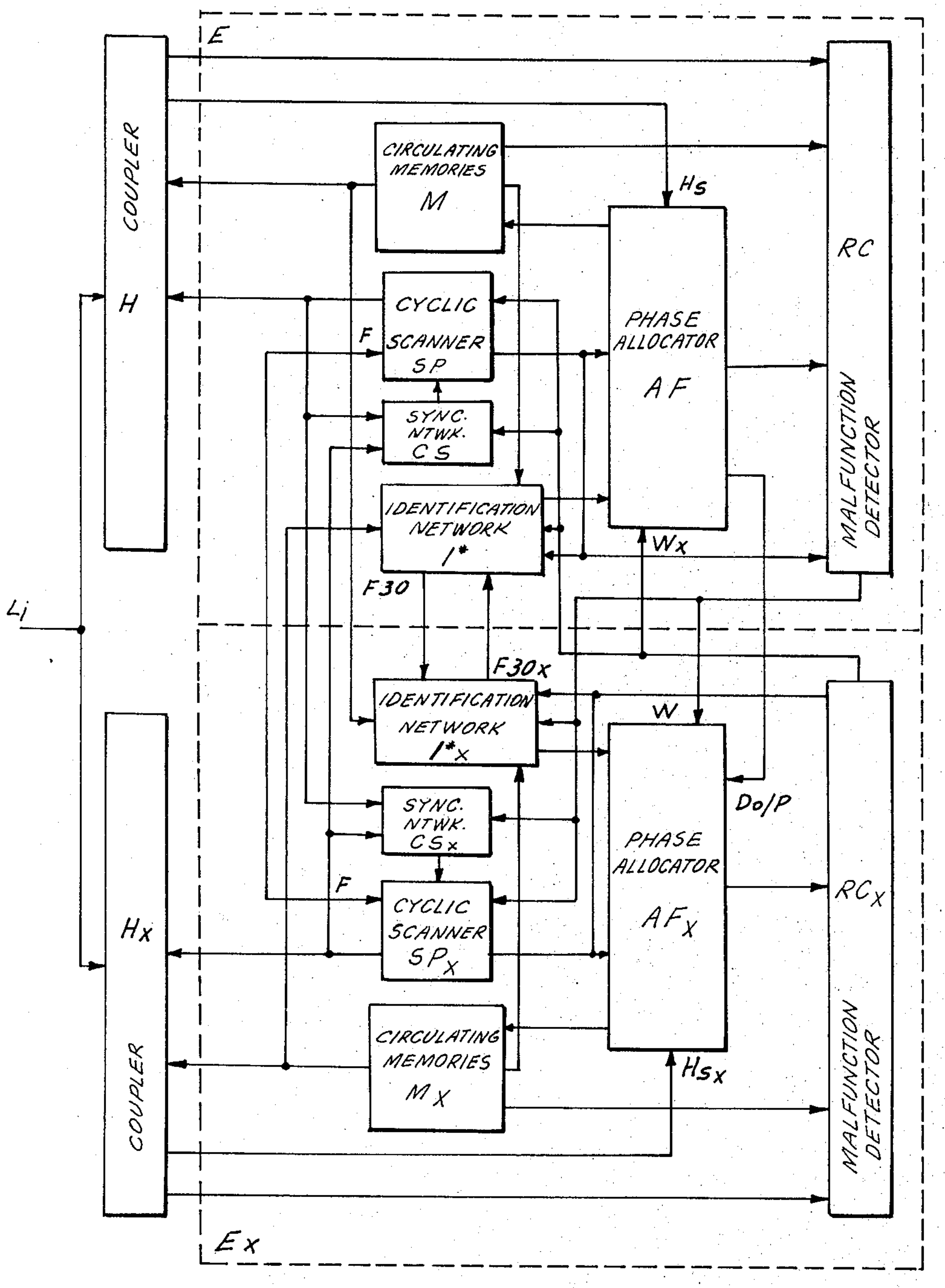
FIG. 1 is a block diagram of the central part of a private-branch exchange embodying our invention.

In FIG. 1 we have shown two computers E and $E_x$ in an exchange serving a multiplicity of subscriber lines $L_i$ terminating at a pair of couplers H and $H_x$, coupler H being controlled by the computer E whereas coupler $H_x$ is controlled by the computer $E_x$. Essentially each computer consists of: a set of recirculating memories M, $M_x$ which control the closing of the switches of the coupling network; a cyclic scanner SP, $SP_x$ which sequentially explores all the subscriber lines in a service time slot of a memory cycle; a synchronizing network CS, $CS_x$ which insures the synchronous stepping of the two cyclic scanners by emitting a reset signal when the synchronism is lost; an identification network I*, $I^*_x$ which indicates the free or busy state of the subscriber or the centralized device whose address is being scanned by the network SP or $SP_x$; a phase allocator AF, $AF_x$; a malfunction detector RC, $RC_x$ supervising the various devices of the computer and of the channel system connected to it.

The disclosed exchange has two different modes of operation with either both or only one of the two computers functioning. The cyclic operation of both computers is assured by a timer, not indicated in FIG. 1, which normally is common to both computers to assure a perfect synchronism. However, a spare timer synchronized with the first one assures the continuous operation of the system even in case of failure of the working timer.

Case 1: Both computers operate normally.

The cyclic scanners SP, $SP_x$ operate in synchronism: when the counting stops in one of these scanners, the other scanner is informed and also stops (exchange of signals F).

If in spite of this the cyclic scanners lose their synchronism (e.g., when one of the computers starts working again after a failure), this fact is detected by the two synchronizing networks CS, $CS_x$ which restart the counters of both scanners from a predetermined starting number (resetting of the cyclic scan).

The consequence of the synchronism of the cyclic scanners is that the information (signals Hs, $Hs_x$) about the status of the line current of each subscriber is simultaneously sent to both computers, specifically to the allocation networks AF, $AF_x$ thereof; besides, the identification networks I*, $I^*_x$ detect, in the same line cycle, the free or busy condition of any subscriber and, for this purpose, exchange data from the local computer (signals $F_{30}$, $F_{30x}$).

The first free phase found on either computer by the allocation networks is assigned to the subscriber which seeks to establish a connection.

A priority criterion is provided among the two computers for the case in which the first free phase or time slot is the same in both computers. Such a criterion is indicated by a signal Do/P sent by the computer E to the computer $E_x$ in the presence of a free channel, this signal inhibiting the assignment of that time slot in the computer $E_x$.

Case 2: A computer is not operating.

For instance, computer $E_x$ fails. The malfunction detector network $RC_x$ sends to the other computer E a signal $W_x$ which frees the cyclic scanner SP from the synchronism constraint, prevents the network I from checking the free condition of a subscriber in the other computer, and commands the allocator AF to assign the time slot without considering the computer $E_x$.

As long as a computer is completely out of use, the traffic-handling capacity of the exchange is cut in half as only one channel system is employed.

Figure 2:
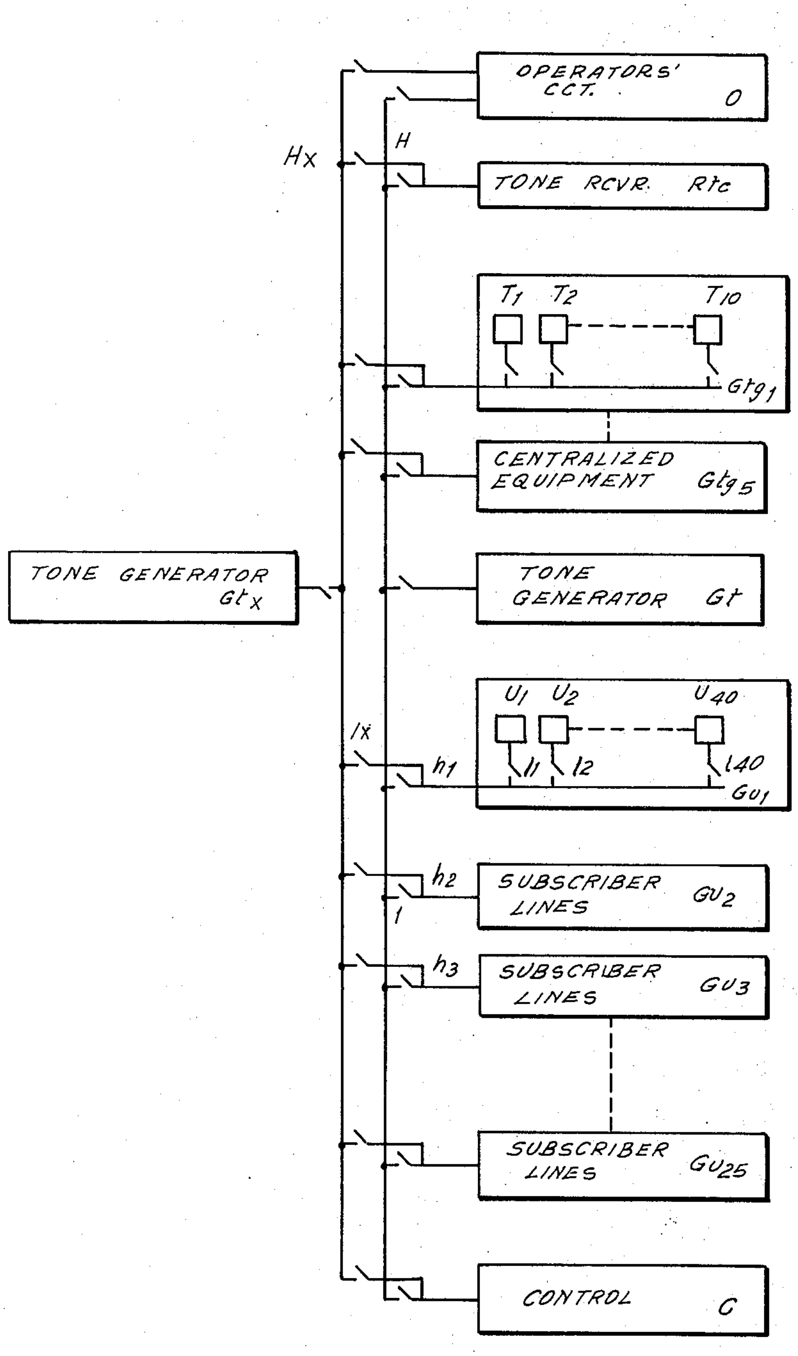
FIG. 2 is a diagram of a set of channels linking the exchange with a multiplicity of subscriber lines.

To limit the effects of a possible failure of the coupling network and to prevent the breakdown of a computer whenever such a failure happens, the arrangement shown in FIG. 2 is adopted in which the subscribers and the centralized devices have access to a main signal path through secondary channels or branch paths. Such a layout, in the case of a switching network controlled only by a single computer, is described in the abovementioned U.S. Pat. No. 3,624,304.

The coupling network of FIG. 2 consists of two primary voice channels, i.e., the coupler $H_x$ for computer $E_x$ and the coupler H for computer E. The associated subscriber circuits are subdivided into 25 groups $Gu_1$, . . . ., $Gu_{25}$. Each subscriber circuit is linked to a branch path associated with its own group by means of an individual switch. The subscribers $U_1$, $U_2$, ... $U_{40}$ of group $Gu_1$ are linked to a branch $h_1$ by means of switches $l_1$, $l_2$, ... $l_{40}$; those of group $Gu_2$ are served by a branch $h_2$; and so on. Each branch is separately connected to both primary paths by means of section switches such as those designated $l_x$ and $l$ in the case of branch $h_7$. The centralized devices consist of: five groups $Gtg_1$, ... $Gtg_5$ of translators and junctions, each group including 10 such devices $T_1$, $T_2$, ... $T_{10}$; a group of tone receivers RTc; a group of operator's circuits O; control devices C for the switching system; and two tone generators $Gt_x$, $Gt$, one for each primary voice channel. The voice-channel system is accompanied by a signal-channel system (not shown in FIG. 2) with a substantially similar layout.

The branch channels are not split for practical reasons, particularly to reduce the complexity of the switching system and therefore its cost.

With a structure like this it is possible to carry on two distinct conversations in the same time slot via the two main channels; it must be avoided, though, that one of the subscribers engaged in a conversation on one of these channels belongs to the same group as any subscriber engaged in a simultaneous conversation over the other channel, in view of the fact that the branches are common to both channels.

Figure 3A:
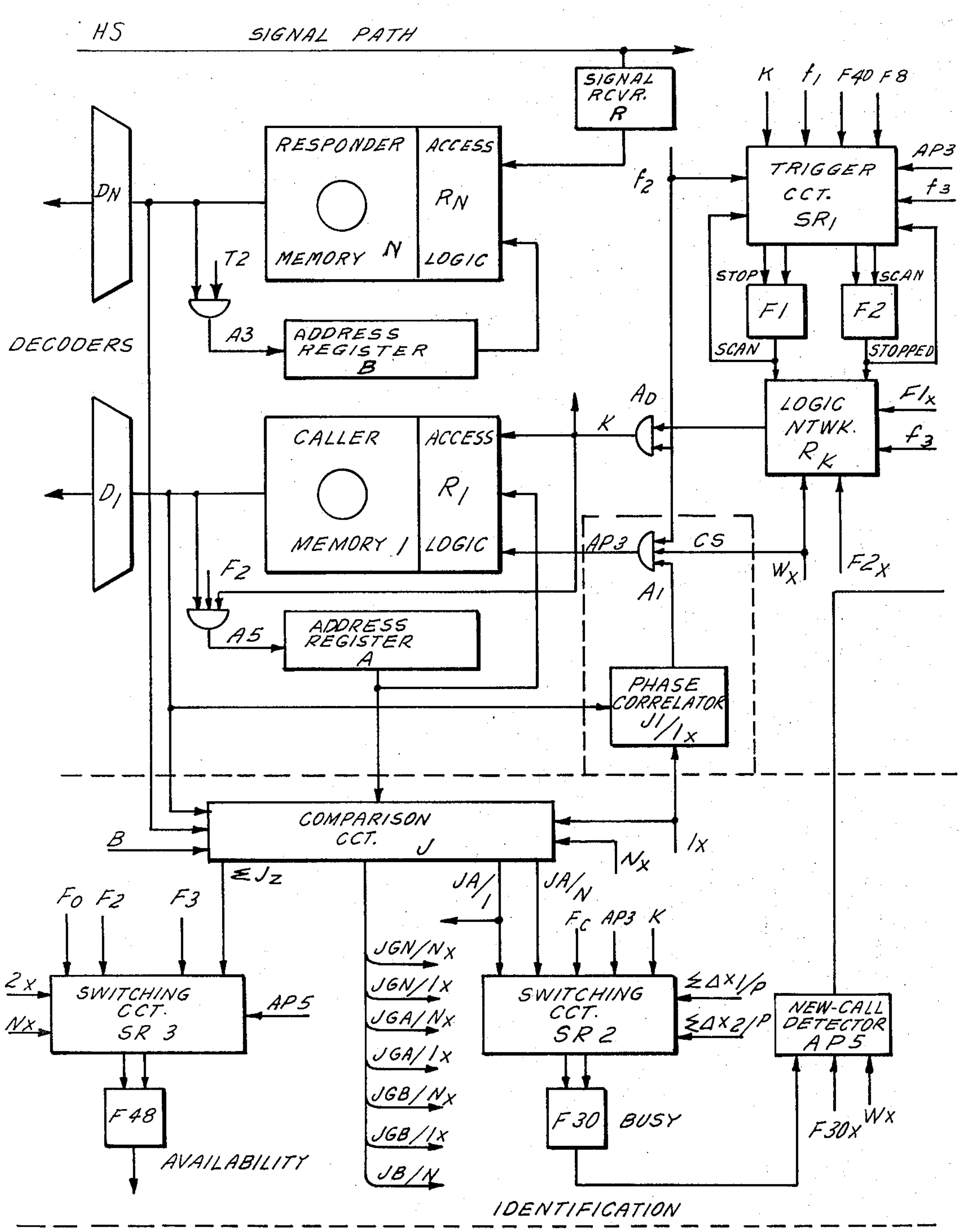
FIGS. 3A and 3B, when placed side by side, show details of one of two computers illustrated in the diagram of FIG. 1.
Figure 3B:
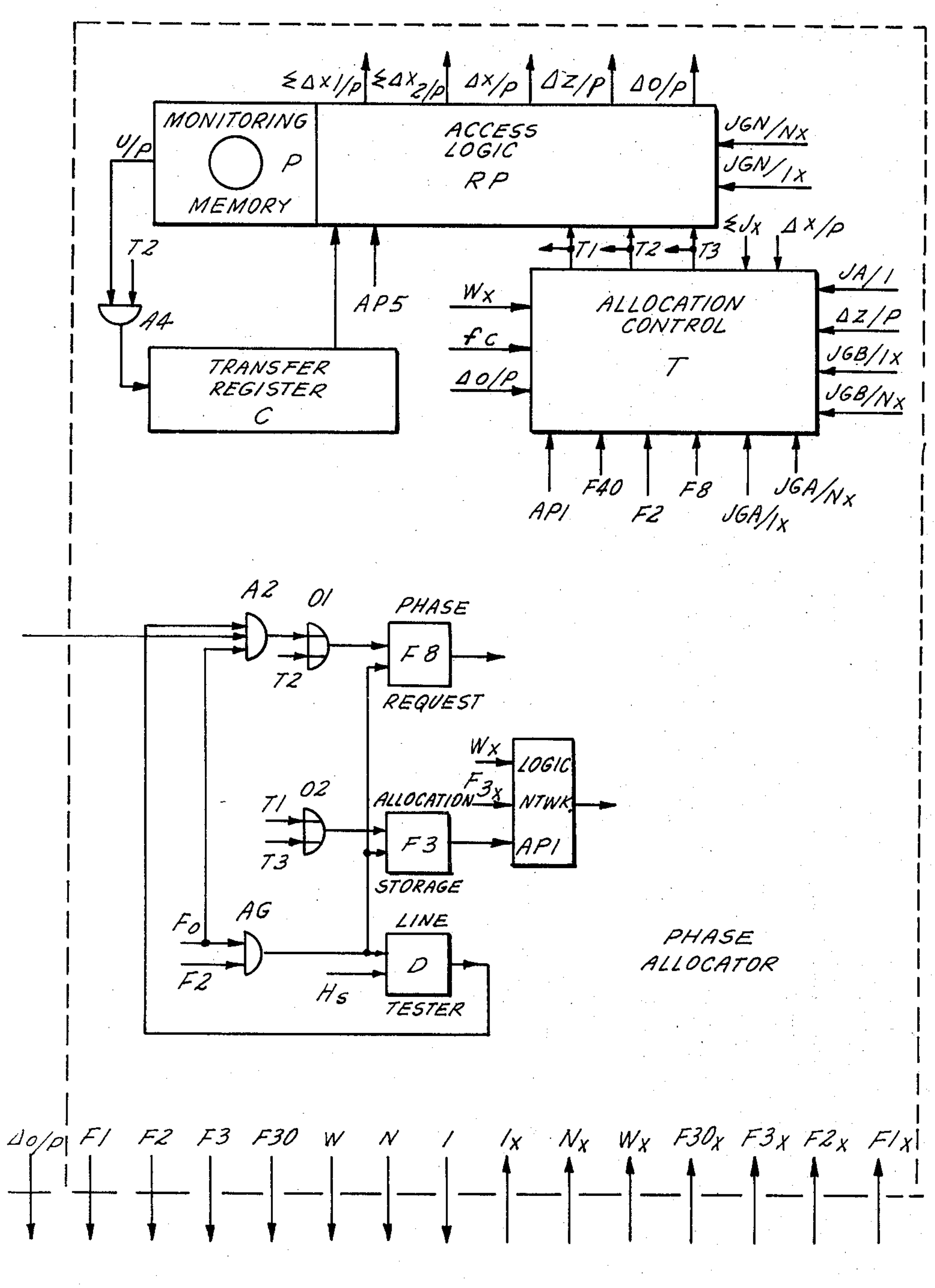

In the detailed description now given with reference to FIGS. 3A and 3B, the following notation is used:

S/X indicates the setting of a bistable circuit X;

R/X indicates the resetting of such bistable circuit X.

The memory unit designated M in FIG. 1, consists of two recirculating memories N and I, logical access networks $R_N$ and $R_I$ for these memories, and decoders $D_I$ and $D_N$. In memory I are stored the addresses of the calling subscribers; memory N registers the addresses of the called subscribers. The addresses appearing in the outputs of the memories I AND N control in the coupling network, through the decoders $D_I$ and $D_N$, the switches associated with the subscribers that have been found active. The logical networks $R_I$ and $R_N$ respectively coupled to the caller memory I and to the responder memory N facilitate the performance, in any phase of these memories, of some of these basic operations: entry of the digital input information in the memory; forward or backward pulse counting; inscription of predetermined binary numbers (e.g., for phase resetting).

A system which performs these functions, comprising a recirculating memory and a logical network, is described in commonly owned U.S. Pat. No. 3,581,016.

The cyclic scanner SP consists of a service phase $f_2$ of the memory I which acts as a counter in conjunction with the logical network $R_f$; a register A which retains the address writeen in the phase $f_2$ for the number of line cycles necessary to perform the operations concerning the address; a logical network $R_k$ which unblocks an AND gate $A_0$ in response to stepping pulses for the primary scanner; two bistable circuits or flip-flops $F_1$ and $F_2$; and a control network $SR_1$ for these flip-flops. Flip-flop $F_1$ indicates that the cyclic scanning must stop for a line cycle. The flip-flop $F_2$ indicates the line cycle in which the cyclic scan is halted and in which all the operations determined in the previous line cycle can be performed.

The logical equations of the network $SR_1$ are as follows:

$S/F_1 = f_1(F_8 + F_{40})$ $R/F_1 = f_3$ $S/F_2 = f_2 \cdot F_1 \cdot \overline{K}$ $R/F_2 = K + AP_3.$ The signals $f_1$, $f_2$ and $f_3$ are phase signals emitted by a timer not further illustrated.

$K$ is a signal for advancing the cyclic scanner; $AP_3$ is a signal indicating that the cyclic scanners of the two computers are out of step; $F_{40}$ is a signal emitted by the corresponding flip-flop and indicates that the register A contains the address of a free centralized device and that this device can be assigned; $F_8$ is a signal emitted by the corresponding flip-flop and indicates that the subscriber whose address is presently written in the register A seeks to start a connection.

The cyclic scan is stopped, in response to the switching logic of the bistable circuit $F_1$, whenever a phase or a centralized device is requested.

The resetting of the bistable circuit $F_2$ is caused by the pulses $K$ when the cyclic scanning on both computers is in phase; in the opposite case, it is caused by a signal $AP_3$ which indicates the asynchronism of the two cyclic scans in order to avoid wrong assignments of conversation phases or of centralized devices. The pulses $K$ are produced by the AND gate $A_0$ and by the logical network $R_K$, according to the following logical equation;

$$K = f_2(\overline{F_1} \cdot W_x + \overline{F_1} \cdot \overline{F_{1x}} \cdot \overline{W_x} + F_2 + F_{2x} \cdot \overline{W_x}).$$

When the computer $E_x$ is not working (signal $W_x$ at level 1), the emission of the pulses $K$ is determined only by the state of the two local flip-flops $F_1$ and $F_2$.

With computer $E_x$ operating (signal $\overline{W_x}$ at level 1) the emission of the pulses $K$ is determined also by the state of the two flip-flops $F_{1x}$ and $F_{2x}$ which are part of the cyclic scanner of the computer $E_x$. With $A_5$ we have symbolically indicated a set of gates through which, in connection with the phase signal $f_2$ and the scan-advancing signal $K$, the address in primary scanning is transferred to the register A.

The synchronizing network CS includes a phase correlator $J_l/I_x$ and a gate $A_1$.

The phase correlator $J_l/I_x$ establishes that the cyclic scans of the two computers are synchronous and in phase; otherwise, an output pulse $AP_3$ is produced by the gate $A_1$ to reset the counter of the associated scanner to a predetermined starting number.

The signal $W_x$ suspends the synchronization when the computer $E_x$ fails.

The identification network I* consists of a comparison circuit J, two bistable circuits $F_{30}$ and $F_{40}$ with associated logical switching circuits $SR_3$ and SR 2, and a logical network $AP_5$. Network J produces: a signal JA/I or JA/N when it detects the identity between the contents of the register A and the contents of the phase presently read out from memory I or N, respectively; a signal JB/N when there is identity between the contents of the register B and the contents of the output phase of the memory N; a signal $JGA/I_x$ or $JGA/N_x$ when it detects that the address written in the register A belongs to the group of addresses written in the output phase of memory $I_x$ or $N_x$, respectively, of the other computer; a signal $JGN/I_x$ or $JGN/N_x$ when it detects that the address written in the output phase of the memory N is commonly grouped with an address written in the same phase of the memory $I_x$ or $N_x$, respectively, of the other computer; and a signal $JGB/I_x$ or $JGB/N_x$ when it detects that the address written in the register B is commonly grouped with an address written in the output phases of the memory $I_x$ or $N_x$, respectively.

Flip-flop $F_{30}$ registers the information that the address written in the register A is stored already in one of the memories I and N of the computer E. This information is detected by the comparator J in the line cycle in which the address has appeared in the register A, and is retained in that flip-flop for the whole following line cycle. The logical network $SR_2$ performs the following logical equations:

$$S/F_{30} = f_c(JA/I \cdot \Sigma\Delta x_1/P + JA/N \cdot \Sigma\Delta x_2/P)$$

$$R/F_{30} = K + AP_3.$$

The signals $JA/I$ and $JA/N$ indicate the identity between the contents of the register A and those of a phase of the memory I and N, respectively. A signal $f_c$ produced during occurrence of the conversation phases prevents the identities revealed in a service phase from being taken into consideration.

With $\Sigma\Delta x_1/P$ and $\Sigma\Delta x_2/P$ is indicated the busy state of any phase of a recirculating monitoring memory $P$ corresponding to an actual connection.

Thus, the recognition of the busy condition excludes the situations in which a subscriber has his address inscribed in the memory I or N without actually participating in a connection. The bistable circuit $F_{40}$, during the first line cycle, indicates that a centralized device is subjected to cyclic scanning; in the second line cycle, it indicates that such a device is assignable. The resetting of the bistable circuit $F_{30}$ is controlled by the stepping pulses $K$ for the cyclic scanner.

The phase allocator $AF$ consists of:

The aforementioned monitoring memory P with a logical access network RP; a bistable circuit $F_8$ which stores the information "request of a phase"; a logical allocation-control network T which causes the entry, in accordance with switching requirements, of the addresses stored in the registers A and B into either the caller memory I or the responder memory N; a bistable circuit D which stores the state of the line current of the subscriber whose address is presently written in the register A; a bistable circuit $F_3$ which stores the information regarding the completed allocation of a phase to the subscriber whose address is presently written in the register A; a register C for the transfer from one phase to another of information written in the memory P.

The memory P and the logical network RP form a sequential network whose structure depends on the operating program of the exchange. We shall discuss only those aspects of that operating program which bear upon the present invention; no details need therefore be given on the construction of the above-mentioned sequential network.

The bistable circuit D is set by a signal Hs coming from the signal channel carrying the subscriber-line current.

A receiving device R interprets the subscriber signals arriving over a channel HS.

This device has the main task of locating the selection criterion of the called subscriber. In the recirculating memory P, in each phase, information is written about the state of a telephone connection which may be in progress in the corresponding time slot; on the basis of this information, available in each computer, the necessary operations are performed to complete the telephone connection requested by the called subscriber.

In the memory element $R_8$ there is registered the information that allocation of a phase requested by a subscriber whose address is written in the register A.

The request of a phase is detected by the presence of the line current, an indication that the subscriber has lifted the microtelephone, and by the fact that the subscriber's address is not inscribed at this time in any of the caller and responder memories of either computer; the latter information is furnished by a logical network $AP_5$ which examines the condition of the flip-flop $F_{30}$ and its nonillustrated counterpart $F_{30x}$ in the other computer.

The network AP operates according to the logical equation:

$$AP_5 = \overline{F_{30}} \cdot \overline{F_{30X}} \cdot \overline{W_x} + \overline{F_{30}} \cdot W_x.$$

The meaning of this equation is that when the computer $E_x$ is operating (signal $\overline{W_x}$) the busy condition of the subscriber whose address is written in the register A is checked in both computers; on the other hand, when the other computer $E_x$ fails or for some other reason does not operate (signal $W_x$), the busy condition is checked only on the computer here considered.

In the presence of the signals $D$, $AP_5$ and $f_0$, the flip-flop $F_8$ switches and stores the information that a phase must be assigned to the address written in the register A.

The presence of the phase signal $f_0$ imposes the condition that this information be registered in the flip-flop $F_8$ at the beginning of a line cycle.

The resetting of the bistable circuits $F_3$, D, $F_8$ is controlled by the signals $f_0$, $F_2$ through an AND gate $A_6$ upon termination of the operations which have caused the stopping of the cyclic scan.

The phase now allocated (designated $h$ hereinafter) is the first one which is found free in one computer or the other when both are working. The phase $h$ is assigned by entering in the caller memory $I$ the address written in the register A. The appropriate command (signal $T_1$) is furnished by the logical network T in accordance with the following logical equation: $T_1 = \overline{f_c} \cdot F_2 \cdot F_8 \cdot \Delta o/P \cdot \overline{AP_1} \cdot (\overline{JGA/I_x} \cdot \overline{JGB/I_x} \cdot \overline{JGB/N_x} \cdot \overline{JGA/N_x} \cdot \overline{W_x} + W_x)$.

In this phase the register B is reset, therefore the output signals $\overline{JGB/I_x}$ and $\overline{JGB/N_x}$ are present at the identification network; these signals impose a condition which is automatically satisfied. Their presence, however, enables an operation, which will be described later on, initiated by the same signal $T_1$. The signal $AP_1$ (complement of $\overline{AP_1}$) is produced by the logical network API according to the following logical equation:

$$AP_1 = F_3 \cdot F_{3x} \cdot W_x + F_3 \cdot W_x.$$

The signal $F_3$ is produced by the bistable circuit $F_3$ in its set condition.

The bistable circuit $F_3$ is set by the same signal $T_1$, through an Or gate or logical sum circuit $0_2$. Signal $AP_1$ inhibits a further assignment of a phase to the same subscriber. The signal $AP_1$, serving to inhibit subsequent phase assignment in the computer E to the subscriber whose address is written in the register A, is produced also in the presence of the signal $F_{3x}$ coming from the computer $E_x$ when the latter computer operates (signal $W_x$) and when the bistable circuit $F_{3x}$ is set to indicate that in computer $E_x$ a free phase has been found and that this phase has been assigned to the subscriber whose line is being sampled in the cyclic scan. According to the above-written logical equation the signal $T_1$ is produced, with the computer $E_x$ in operation (signal $\overline{W_x}$), when simultaneously the following conditions are satisfied:

1. a phase request is in progress (signal $F_8$);
2. a free phase is present in the computer concerned (signal $\Delta o/P$);
3. the line cycle characterized by the signal $F_3$ is in progress (i.e., the activity of a subscriber is being checked);
4. the examined phase $h$ is one of the phases assigned to the establishment of a telephone connection, i.e., a conversation phase and not a service phase (signal $\overline{f_c}$);
5. a phase has not yet been assigned to the requesting subscriber (signal $\overline{AP_1}$);
6. The address in the register A is not that of a subscriber line in the same group as a busy line participating in a telephone connection via computer $E_x$ in the same phase (signals $\overline{JGZ/I_x}$ and $\overline{JGA/N_x}$). Alternatively, with the computer $E_x$ cut off (signal $W_x$), only the above-listed conditions (1), (2), (3), (4), (5) need be fulfilled.

The periodic signal $f_c$, whose duration encompasses all the time slots assigned to telephone connections, has the purpose of preventing the generation of the signal $T_1$ in the presence of the service phases. The signal $F_2$ limits the performance of the address-transfer operation to the line cycle in which the cyclic scan is halted.

The computer $E_x$ differs from the computer E by the fact that the signal $T_{1x}$, corresponding to the signal $T_1$, requires the existence of the signal $\Delta o/P$ besides the signal $\Delta o/P_x$ when the computer E is working.

Once the phase has been assigned, the logical network RP, with the aid of the memory P, controls the operations necessary to register in the allocated phase $h$ of memory P the data relating to progress of the requested connection. On the basis of the selection criteria sent by the calling subscriber and transferred by the device R, the address of the called subscriber is inscribed in the allocated phase of the memory N. This address is subjected to two checks: that it does not pertain to a subscriber engaged in a conversation, and that no address of a subscriber of the same group is written in the same phase of the memories $N_x$ and $I_x$ of the other computer. The first check is conventionally carried out through the cyclic scanning; the information is delivered to the network RP by the signal $AP_5$.

The second check is carried out by the comparator J which thereupon emits the signals $JGN/I_x$, $JGN/N_x$ when the address belongs to a common group as defined above.

In the presence of one of the signals $JGN/I_x$, $JGN/N_x$ a shift from the phase $h$ to another free phase is necessary. The transfer operation is controlled by the logical network T when in the output of the comparator J there appears the signal $JA/I$ indicating the identity between the address scanned by the network SP and the address of the calling subscriber.

When this condition occurs, the logical network T emits a signal $T_2$ on the basis of the following logical equation:

$$T_2 = \Delta x/P \cdot JA/I \cdot (JGN/I_x + JGN/N_x).$$

Signal $\Delta x/P$ represents the information written in phase $h$ of memory P to indicate the necessity of a transfer from one phase to another.

The expression for $T_2$ requires that one of the two signals $JGN/I_x$ and $JGN/N_x$ be present; otherwise, the connection established in phase $h$ of computer $E_x$ may be terminated before the address of the calling subscriber reappears in register A, thereby rendering useless the transfer of the connection from the now available phase $h$. Thus, in the presence of the signal $\overline{T_2}$, phase $h$ of memory P advances to the next stage of the operation.

The signal $T_2$ controls the setting of the bistable circuit $F_8$, through OR gate $0_1$, and the writing of the contents of phase $h$ of memory N in register B. An AND gate $A_3$ represents a set of gate circuits unblocked by the signal $T_2$ to enable the entry in register B of the address recorded in phase $h$ of memory N.

Besides, the signal $T_2$ controls the transfer of the signals $U/P$ from the memory P to a register C through a set of gate circuits symbolized by an AND gate $A_4$.

The setting of flip-flop $F_8$, preparatorily to the assignment of a free phase during the line cycle marked by the signal $F_2$, halts the cyclic scan; therefore, in the first free phase $k$ which satisfies the condition that signals $\overline{JGA/I_x}$, $\overline{JGA/N_x}$, $\overline{JGB/I_x}$, $\overline{JGB/N_x}$ be present, the logical network T emits the signal $T_1$ which controls the entry of the contents of register A in the new phase $k$ of memory I, of the contents of register B in the same phase $k$ of memory N, and of the contents of register C in the corresponding phase $k$ of memory P.

Thereafter, the establishment of a connection is resumed in the new phase $k$. The last two entries (from B to N and from C to P) are controlled by the signal $T_1$ also upon the first phase assignment; in this case, though, the contents of registers B and C respectively correspond to those of phase $h$ of memories N and P so that the entry does not change the situation in phase $h$ of these memories.

A request for a specific centralized device advances the allocated phase in memory P to a state which indicates such a request and the type of centralized device (outgoing translator, operator, outgoing junction, tone receiver). When the address of a centralized device is entered in the register A, switching circuit $SR_3$ emits the signal $S/R_{40}$ to set the flip-flop $F_{40}$:

$$S/F_{40} = f_3 \cdot S/F_{40} = f_3 \cdot \overline{F_2} \cdot \Sigma J_z.$$

The symbol $\Sigma J_Z$ represents the identification signals for the several centralized devices emitted by the comparison circuit J.

The new-call detector $AP_5$ indicates whether the centralized device whose address is stored in the register A is free or busy: if it is busy, a resetting signal $R_1/F_{40}$ for flip-flop $F_{40}$ is produced at the beginning of the following line cycle according to the following logical equation:

$$R_1/F_{40} = f_0 \cdot \overline{AP_5}.$$

If the centralized device is free, the flip-flop is not reset; in the following line cycle (the cyclic scan being halted) the network T, whenever it should find in progress the request for a centralized device of that kind, causes entry of the contents of the register A (address of the centralized device) in the memory N according to this logical equation:

$$T_3 = F_2 \cdot F_{40} \cdot f_c \cdot \Sigma(J_Z \cdot \Delta z/P) \cdot API.$$

The logical product $(J_Z \cdot \Delta z/P)$ assumes the logical value 1 when the signal $J_Z$ relates to an address written in the register A which locates a centralized device of the type requested by the entry $\Delta z/P$ in the memory P. Flip-flop $F_3$, in repose to the signal $T_3$ passing the OR gate $O_2$, stores the information about the allocation of the centralized device whose address is presently entered in the register A.

The information $\overline{F_3}$ indicates that the centralized device has not been assigned to another connection.

The signal $F_{3x}$ coming from the other computer in the operative condition thereof (signal $\overline{W_x}$ present) signifies that the same centralized device has been assigned to the other computer.

At the end of the line cycle identified by the signal $F_2$, flip-flop $F_{40}$ is reset by the network $SR_3$ with a signal $R_2/F_{40}$ produced according to the following logical equation: $R_2/F_{40} = f_0(F_2 + F_{2x} \cdot \overline{W_x})$.

For the centralized devices served by a single voice channel there is the problem of the transfer of an established connection if the comparison circuit J emits the signals $JGN/I_x$ and $JGN/N_x$ in the event of a busy time slot. The transfer of the connection to another free channel is carried out, as in the case in which a subscriber address appears in the memory N, through the network T via signals $T_1$ and $T_2$.

FIG. 3A shows the signals exchanged between the two computers. The following signals reach the computer E: $I_x$ (the address in the output of memory $I_x$), $N_x$ (the address in the output of memory $N_x$), $W_x$, $F_{30x}$, $F_{3x}$, $F_{2x}$, $F_{1x}$. The following signals reach the computer $E_x$: $I$ (the address in the output of memory I), $N$ (the address in the output of memory N), $W$ (computer E faulty), $F_{30}$, $F_3$, $F_2$, $F_1$, $\Delta o/P$ (priority of E over $E_x$).

We claim:

1. In an exchange for a time-division-multiplex communication system serving a multiplicity of subscriber lines identified by individual addresses, in combination:

a primary and a secondary processor each including a circulating caller memory, a circulating responder memory and a circulating monitoring memory, each of said memories being divided into a predetermined number of service phases and conversation phases representing respective time slots in a recurrent memory cycle, the conversation phases of said caller and responder memories serving for the storage of addresses of subscriber lines initiating a call or engaged in a conversation, the conversation phases of said monitoring memory serving for the storage of data relating to a call initiated or in progress from a subscriber line whose address is entered in a corresponding conversation phase of the associated caller memory;

timing means for stepping all memories of both processors in synchronism through consecutive memory cycles;

scanning means in each processor for periodically sampling said subscriber lines in a service phase of successive memory cycles and ascertaining the activity thereof;

test means responsive to said scanning means for determining the absence of an entry of the address of an active subscriber line in any conversation phase of each caller and responder memory;

first allocation means in each processor controlled by the associated monitoring memory for entering the address of any previously unentered active subscriber line in the first free conversation phase of the associated caller memory;

preference means controlled by both monitoring memories for inhibiting the entry of an address in the first free conversation phase of the caller memory of said secondary processor upon a coincidence of said first free conversation phase with a first free conversation phase of the caller memory of said primary processor;

malfunction-detecting means responsive to a fault indication from either processor for limiting the operation of said first allocation means to the caller memory of the other processor, sadi preference means being ineffectual upon the occurrence of a fault indication from said primary processor; and second allocation means responsive to entry in a conversation phase of either monitoring memory, corresponding to a phase allocated in the associated caller memory to an active subscriber line, of an identification of a called subscriber line for entering the address of the latter subscriber line in the corresponding phase of the associated responder memory preparatorily to the establishment of a connection between the two subscriber lines so entered.

2. The combination defined in claim 1 wherein said subscriber lines are divided into groups along common branches of two parallel paths respectively linking same with said processors, further comprising check means for preventing entry of the address of a previously unentered subscriber line by said first allocation means in a free conversation phase of the caller memory of either processor in the presence of an address of any commonly grouped subscriber line in a concurrent phase of either of the caller and responder memories of the other processor, and transfer means controlled by said check means and responsive to entry of the address of a called subscriber line in a phase of the responder memory of said one processor by said second allocation means in the presence of an address of a subscriber line commonly grouped with said called line in a concurrent phase of either of the caller and responder memories of said other processor for shifting the addresses of said active and called lines from the first-allocated conversation phase of the caller and responder memories of said one processor to the next free conversation phase of the same memories with no address of a commonly grouped subscriber line in a concurrent phase of the caller and responder memories of the other processor.

* * * * *